(12) United States Patent
Kimura et al.

(10) Patent No.: US 7,494,438 B2
(45) Date of Patent: Feb. 24, 2009

(54) STARTING APPARATUS FOR DIFFERENTIAL PLANETARY GEAR APPARATUS

(75) Inventors: Katsumi Kimura, Tokyo (JP); Toshio Miwa, Tokyo (JP); Michio Takashima, Tokyo (JP); Takeshi Usami, Tokyo (JP); Kazuhiko Sugiyama, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 11/712,988

(22) Filed: Mar. 2, 2007

(65) Prior Publication Data

US 2007/0155570 A1 Jul. 5, 2007

Related U.S. Application Data

(62) Division of application No. 10/505,218, filed on Aug. 20, 2004, now Pat. No. 7,211,018.

(51) Int. Cl.
F16H 48/30 (2006.01)
(52) U.S. Cl. .............................. 475/150; 475/153
(58) Field of Classification Search .............. 475/149, 475/450, 153
See application file for complete search history.

(56) References Cited

U.S. PATENT DOCUMENTS

| | | | |
|---|---|---|---|
| 2,436,582 A * | 2/1948 | Lear | 318/8 |
| 2,436,936 A * | 3/1948 | Page | 318/8 |
| 3,503,281 A | 3/1970 | Gsching et al. | |
| 4,514,991 A | 5/1985 | Zinsmeyer | |
| 4,973,295 A | 11/1990 | Lee | |
| 5,019,755 A | 5/1991 | Walker | |
| 5,396,214 A | 3/1995 | Kumar | |
| 5,433,282 A | 7/1995 | Moroto et al. | |
| 5,508,574 A | 4/1996 | Vlock | |
| 5,865,263 A | 2/1999 | Yamaguchi et al. | |
| 5,947,854 A | 9/1999 | Kopko | |
| 6,648,785 B2 | 11/2003 | Porter | |

FOREIGN PATENT DOCUMENTS

| | | |
|---|---|---|
| EP | 1 136 298 | 9/2001 |
| FR | 2 609 499 A1 | 7/1988 |
| JP | 58-69146 | 5/1983 |
| JP | 60-87698 | 5/1985 |
| JP | 05-319110 | 12/1993 |
| JP | 06-249305 | 9/1994 |
| JP | 07-236201 | 9/1995 |
| JP | 11-82649 | 3/1999 |

OTHER PUBLICATIONS

European Search Report dated Apr. 4, 2006.

* cited by examiner

*Primary Examiner*—Ha D. Ho
(74) *Attorney, Agent, or Firm*—Westerman, Hattori, Daniels & Adrian, LLP.

(57) ABSTRACT

A differential planetary gear apparatus has a single-pinion-type structure in which one planetary gear (3) is arranged in a radial direction and one or more planetary gears (3) are arranged in a circumferential direction in a region between a sun gear (1) and a ring gear (2), a drive source (4), a speed-change motive source (5), and a driven unit (6) are disposed at any one of an input side (I), an output side (O), and a speed-change side (T), respectively, and the speed-change motive source (5) includes an electric motor.

3 Claims, 14 Drawing Sheets

STARTING APPARATUS FOR DIFFERENTIAL PLANETARY GEAR APPARATUS

CROSS-REFERENCE TO RELATED APPLICATIONS

This application is a Divisional application of U.S. patent application Ser. No. 10/505,218, filed on Aug. 20, 2004, and wherein application Ser. No. 10/505,218 is a national stage application filed under 35 USC §371 of International Application No. PCT/JP03/01922, filed Mar. 25, 2004, the entire contents of which are herein incorporated by reference.

TECHNICAL FIELD

The present invention relates to a differential planetary gear apparatus, and a starting apparatus and method for a differential planetary gear apparatus.

BACKGROUND ART

In a differential planetary gear apparatus, there has recently been a demand for using a motor, e.g., an inverter motor, as a rotational drive source for speed change in order to accurately control a transmission ratio.

As one of apparatuses which can meet such a demand, there has been known a differential planetary gear apparatus shown in FIG. 14, for example.

The differential planetary gear apparatus shown in FIG. 14 comprises a sun gear Sg fixed to a tip end of an input shaft 55 connected to a drive source 50, a plurality of first planetary gears (pinion gears) P1 disposed radially outwardly of the sun gear Sg and meshing with this sun gear Sg, a plurality of second planetary gears (pinion gears) P2 meshing with the first planetary gears P1, a ring gear Rg having internal teeth which mesh with the second planetary gears P2 being internally contacted with the internal teeth, and an output shaft 65 connected to an edge portion of the ring gear Rg, each of which serves as a basic element of a transmission mechanism.

The differential planetary gear apparatus further comprises a hollow shaft Ca as the basic element. The input shaft 55 passes through the hollow shaft Ca in such a state that the input shaft 55 is rotatable relative to the hollow shaft Ca. The differential planetary gear apparatus further comprises a carrier C. This carrier C comprises an end surface Cb connected perpendicularly to an end of the hollow shaft Ca at the center thereof, and first and second support shafts J1 and J2 extending from the end surface Cb in parallel with the hollow shaft Ca and disposed around the hollow shaft Ca.

The plurality of first planetary gears P1 are rotatably supported by the first support shafts J1, and the plurality of second planetary gears P2 meshing with the first planetary gears P1 are rotatably supported by the second support shafts J2.

A gear Cc is formed on a circumferential edge portion of the end surface Cb of the carrier C, and this gear Cc meshes with braking gears 70 and 80. These braking gears 70 and 80 are connected to brake devices B1 and B3 via rotating shafts 75 and 85, respectively.

The above-mentioned differential planetary gear apparatus shown in FIG. 14 is of a double-pinion type.

However, this double-pinion-type differential planetary gear apparatus has a number of components, and hence the structure thereof becomes complicated and the radial size thereof becomes large. Further, because of mechanical unbalance in the radial direction, this type of differential planetary gear apparatus is unsuitable for a high-speed rotation. Furthermore, since a rotational speed is controlled by the brake devices B1 and B3, its control accuracy is low.

In a case where a large-capacity constant-speed motor is used as the drive source of the above-mentioned differential planetary gear apparatus, in order to start such a constant speed motor, for example, a rotational speed of this drive source is required to be increased to nearly a rated rotational speed (e.g., a rotational speed within ±5% of the rated rotational speed) in some cases. In such cases, another starting drive means is required in order to increase the rotational speed of the drive source (e.g., the large-capacity constant-speed motor) to nearly a rated rotational speed (e.g., a rotational speed within ±5% of the rated rotational speed).

For example, in a case of starting a squirrel-cage induction motor, full voltage (i.e., full-voltage starting) is not preferable because starting current becomes high. Therefore, it is required to provide a reduced-voltage starter utilizing star delta, reactor, Kondorfer, or the like.

Providing such another starting drive means causes an increase in installation cost and other cost, and also causes a complicated structure.

Further, in a case of using a normal constant-speed motor as the starting drive means, if a constant rotational speed of the constant-speed motor, which serves as the starting drive means, is lower than the above-mentioned rotational speed near the rated rotational speed (e.g., the rotational speed within ±5% of the rated rotational speed), some sort of means is required for increasing the rotational speed. Otherwise, it is difficult to increase the rotational speed of the above-mentioned drive source to nearly the rated rotational speed.

DISCLOSURE OF INVENTION

The present invention has been made in view of the above drawbacks. It is therefore an object of the present invention to provide a differential planetary gear apparatus which eliminates a mechanical unbalance and has a high mechanical efficiency, and can cope with a high-speed operation. It is another object of the present invention to provide a starting apparatus and method for a differential planetary gear apparatus which can reduce a load on a drive source (e.g., a large-capacity constant-speed motor) during the starting.

A differential planetary gear apparatus (A, A-1, A-2) according to the present invention is characterized in that: the differential planetary gear apparatus has a single-pinion-type structure in which one planetary gear (3) is arranged in a radial direction (of a sun gear 1 and a ring gear 2) and one or more planetary gears (3) are arranged in a circumferential direction (of the sun gear 1 and the ring gear 2) in a region between the sun gear (1) and the ring gear (2); a drive source (e.g., a large-capacity constant-speed motor 4 or an internal combustion engine), a speed-change motive source (5), and a driven unit (e.g., a fluid machinery 6 or a turbo machinery) are disposed at any one of an input side (I), an output side (O), and a speed-change side (T), respectively; and the speed-change motive source (5) comprises an electric motor (a small-capacity variable-speed motor).

According to the differential planetary gear apparatus of the present invention having such a structure, a mechanical efficiency is high and a high-speed operation can be achieved because of a so-called "single pinion type" in which rotation is transmitted between the sun gear and the ring gear by the single planetary gear (3). Further, since the small-capacity variable-speed motor is used as the speed-change motive source, the speed change is performed accurately and smoothly.

A differential planetary gear apparatus (A-3, A-4, A-5) according to the present invention is characterized in that: a planetary gear (3) is disposed in a region between a sun gear (1) and a ring gear (2); a drive source (e.g., a large-capacity constant-speed motor 4 or an internal combustion engine), a speed-change motive source (5), and a driven unit (e.g., a fluid machinery 6 or a turbo machinery) are disposed at any one of an input side, an output side, and a speed-change side, respectively; the speed-change motive source comprises an electric motor; and supply of electric power (E) to the speed-change motive source (5) is stopped when the driven unit (6) is decelerated so that the speed-change motive source (5) generates electric power.

According to the differential planetary gear apparatus of the present invention having such a structure, the energy is generated and is thus effectively utilized during the deceleration, and the energy-saving apparatus which can meet the demands of the times can be achieved.

Further, the speed-change motive source (5) can be used as a brake of the differential planetary gear apparatus by utilizing the generated energy in various ways.

In the differential planetary gear apparatus (A-3) of the present invention, it is preferable that the electric power generated by the speed-change motive source (5) is supplied to a resistance means (10).

According to the differential planetary gear apparatus of the present invention having such a structure, the resistance means can be used as a brake of the differential planetary gear apparatus, for example. Therefore, it is not necessary to incorporate another brake system for deceleration and stop of the apparatus, and it is also not necessary to put energy into the brake.

In the differential planetary gear apparatus (A-4) of the present invention, it is preferable that the electric power generated by the speed-change motive source (5) is supplied to a power regenerative converter (11) so as to return the generated electric power to a power source of the speed-change motive source (5).

In the differential planetary gear apparatus (A-5) of the present invention, it is preferable that the electric power generated by the speed-change motive source (5) is supplied to a storage means (12).

According to the differential planetary gear apparatus (A-4, A-5) of the present invention having such a structure, the following advantages can be obtained: When the apparatus is in non-acceleration state (i.e., a deceleration state and a constant-speed state), a surplus energy can be recovered as regenerative electric power or stored electric power, thus enabling an energy-saving operation at all times. While the surplus energy is recovered as the regenerative electric power or the stored electric power, the speed-change motive source (5) can be used as the brake of the differential planetary gear apparatus.

According to the present invention, there is provided a starting apparatus for a differential planetary gear apparatus (A-6, A-7, A-8) having a sun gear (1), a ring gear (2), and one or more planetary gears (3) and having a structure in which a drive source (e.g., a large-capacity constant-speed motor 4), a speed-change motive source (5), and a driven unit (e.g., a fluid machinery 6 or a turbo machinery) are disposed at any one of an input side (I), an output side (O), and a speed-change side (T), respectively, the starting apparatus characterized in that: the drive source (4) is energized after a rotational speed of the drive source (4) is increased to nearly a rated rotational speed by a starting means; the starting means comprises the speed-change motive source (5), a speed-increasing means (13) provided at an output side of the speed-change motive source (5), and a rotation transmitting assembly for transmitting rotation from an output side of the speed-increasing means (13) to the drive source (4); and the rotation transmitting assembly serves as gears (1, 3, g2, g1) and rotating shafts (23, Cj, 21) of the differential planetary gear apparatus (A-6, A-7, A-8).

In the starting apparatus for the differential planetary gear apparatus of the present invention, it is preferable that a stop means (a brake 14/40) is provided on a rotating shaft (an output shaft 22) connected to the ring gear (2), and the stop means (14/40) is operated so as to lock the ring gear (2) while the rotational speed of the drive source (4) is increased by the starting means (5, 13, 23, 1, 3, Cj, g2, g1, 21/35, 37, 23, 1, 3, Cj, g2, g1, 21).

It is preferable that the speed-increasing means comprises a mechanical transmission (13).

According to the differential planetary gear apparatus of the present invention having such a structure, a desirable transmission ratio can be achieved by the rotational speed that is input from the speed-change motive source. Therefore, this differential planetary gear apparatus can effectively perform as a multi-speed transmission or a continuously variable transmission. In addition thereto, the rotational speed of the drive source (4) can be quickly increased to nearly the rated rotational speed by the starting means.

The starting means comprises the speed-change motive source (5), the speed-increasing means (13) provided at the output side of the speed-change motive source (5), and the rotation transmitting assembly for transmitting rotation from the output side of the speed-increasing means (13) to the drive source (4), and the rotation transmitting assembly serves as the gears (1, 3, g2, g1) and the rotating shafts (23, Cj, 21) of the differential planetary gear apparatus (A-6, A-7, A-8). With this structure, it is not required to provided another starting means. Therefore, it is possible to suppress an increase in cost which would occur in the case of providing another starting means, and to prevent a complicated structure.

Further, in the case where the stop means (14) is provided, while the rotational speed of the drive source (4) is increased to nearly the rated rotational speed, a whole torque of the speed-change motive source (5) is put into the drive source (4), and hence the drive source (4) reaches near the rated rotational speed quickly. As a result, it is possible to prevent a load which would be produced when rotating the driven member (e.g., a rotary machine).

The speed-increasing means of the differential planetary gear apparatus comprises an inverter motor (35) and an inverter (37). The inverter may be of a type that is incorporated in the inverter motor.

According to the differential planetary gear apparatus of the present invention having such a structure, the starting of the drive source (4) is controlled by the inverter motor (35) and the inverter (37), and hence the drive source (4) can be started stably.

Further, the small-sized and space-saving apparatus as a whole can be achieved by using the inverter motor (35) and the inverter (37).

In the starting apparatus for the differential planetary gear apparatus according to the present invention, it is preferable that the differential planetary gear apparatus has a single-pinion-type structure in which one planetary gear (3) is arranged in a radial direction and one or more planetary gears (3) are arranged in a circumferential direction in a region between the sun gear (1) and the ring gear (2), and the speed-change motive source (5) comprises an electric motor (e.g., a variable-speed motor 5).

Further, according to the present invention, there is provided a starting method for a differential planetary gear apparatus having a sun gear, a ring gear, and one or more planetary gears and having a structure in which a drive source, a speed-change motive source, and a driven unit are disposed at any one of an input side, an output side, and a speed-change side, respectively, the starting method characterized by: operating a brake so as to lock the ring gear when starting the drive source; starting an inverter and an inverter motor so as to rotate the drive source at a predetermined rotational speed; energizing the drive source to start the drive source at the predetermined rotational speed; and operating the drive source in a normal operation state.

It is preferable that the predetermined rotational speed is within a range of ±5% of a rated rotational speed of the drive source.

Since the motor (e.g., a variable-speed electric motor 5) is used as the speed-change motive source (5), the speed change is performed accurately and smoothly.

Because the planetary gears (3) are of a single pinion type, a differential planetary gear assembly (G) has a high-mechanical efficiency and is suitable for a high-speed operation.

BEST MODE FOR CARRYING OUT THE INVENTION

Hereinafter, embodiments of the present invention will be described with reference to the attached drawings.

First, a differential planetary gear apparatus according to a first embodiment will be described with reference to FIG. 1.

Figure 1:
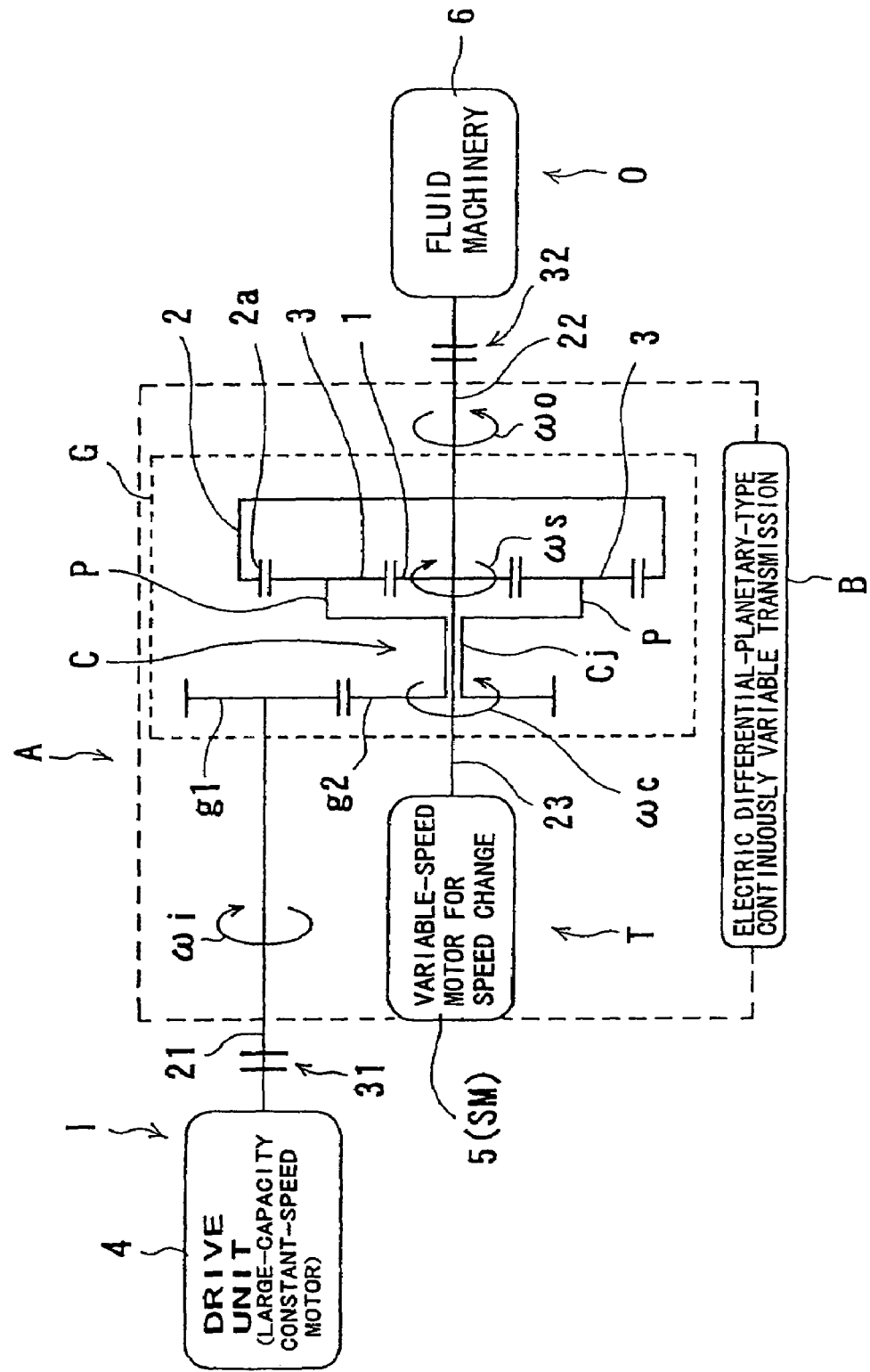
FIG. 1 is a block diagram showing a whole structure of a differential planetary gear apparatus according to a first embodiment of the present invention.

In FIG. 1, the differential planetary gear apparatus, which is indicated by a reference sign A as a whole, comprises an electric differential-planetary-type continuously variable transmission B having an input shaft 21 and an output shaft 22, a drive unit 4 comprising a large-capacity constant-speed motor disposed at an input side I, i.e., connected to one end of the input shaft 21 via an input-side clutch 31, and a fluid machinery 6, such as a turbo machinery, disposed at an output side O, i.e., connected to one end of the output shaft 22 via an output-side clutch 32.

The electric differential-planetary-type continuously variable transmission B comprises a differential planetary gear assembly G having an input shaft and an output shaft (i.e., the input shaft 21 and the output shaft 22) and a speed-change drive shaft 23, and a small-capacity variable-speed motor 5 for speed change connected to the speed-change drive shaft 23.

The differential planetary gear assembly G comprises an input gear g1 fixed to the other end of the input shaft 21, a sun gear 1 fixed to the other end of the speed-change drive shaft 23, a carrier C, a plurality of planetary gears 3 supported by the carrier C, and a ring gear 2 whose one end forms the output shaft 22.

The carrier C comprises a hollow rotating shaft Cj, and an input-side gear g2 fixed to one end (input side) of the rotating shaft Cj and disposed concentrically with the rotating shaft Cj. The input-side gear g2 meshes with the input gear g1. The carrier C further comprises a plurality of planetary gear support shafts P disposed on the other end (output side) of the rotating shaft Cj at radially equal positions with respect to a center of the rotating shaft Cj and spaced from each other at equal intervals in a circumferential direction. These planetary gear support shafts P extend in parallel with the rotating shaft Cj.

The speed-change drive shaft 23 passes through a hollow portion of the rotating shaft Cj of the carrier C in such a state that the speed-change drive shaft 23 is rotatable relative to the rotating shaft Cj. The sun gear 1 fixed to the other end of the speed-change drive shaft 23 meshes with the planetary gears 3.

The planetary gears 3 are rotatably supported by the planetary gear support shafts P of the carrier C, and mesh with the sun gear 1. The planetary gears 3 are held in contact with an internal teeth portion 2a of the ring gear 2 and mesh with the internal teeth portion 2a.

Specifically, in view of only the radial direction of the ring gear 2 and the sun gear 1, this structure is a so-called "single pinion type" in which the rotation is transmitted between the sun gear 1 and the ring gear 2 by the single planetary gear 3.

Operation of the differential planetary gear apparatus according to the first embodiment will be described below.

(1) At the Time of Starting (a) A method in which the speed-change variable-speed motor and the drive unit are started at the same time When starting the fluid machinery 6, first, the drive unit 4 is operated. At the same time, the speed-change variable-speed motor 5 is started at a minimum speed. Accordingly, the carrier C driven by the drive unit 4 and the sun gear 1 directly connected to the speed-change variable-speed motor 5 are rotated simultaneously. The planetary gears 3 are rotated on the carrier C at a rotational speed given by multiplying a relative rotational speed between the carrier C and the sun gear 1 by a gear ratio of the planetary gear 3 to the sun gear 1. The ring gear 2 directly connected to the fluid machinery 6 is started to be rotated at a rotational speed given by multiplying an absolute rotational speed of the planetary gear 3 by a gear ratio of the ring gear 2 to the planetary gear 3.

When the drive unit 4 reaches the rated rotational speed, the speed-change variable-speed motor 5 is being rotated at a minimum speed, and hence the fluid machinery 6 is operated at a minimum speed.

(b) A method in which the rotating shaft of the speed-change variable-speed motor is locked A brake (not shown) incorporated in the speed-change variable-speed motor 5 is operated to lock the rotating shaft (i.e., the sun gear 1) of the speed-change variable-speed motor 5. Subsequently, the drive unit 4 is operated. Accordingly, since the sun gear 1 directly connected to the speed-change variable-speed motor 5 is locked, the planetary gears 3 are rotated on the carrier C at a rotational speed given by multiplying the rotational speed of the carrier C, which is driven by the drive unit 4, by a gear ratio of the planetary gear 3 to the sun gear 1. The ring gear 2 directly connected to the fluid machinery 6 is started to be rotated at a rotational speed given by multiplying an absolute rotational speed of the planetary gears 3 by a gear ratio of the ring gear 2 to the planetary gear 3.

After the drive unit 4 reaches the rated rotational speed, the brake of the speed-change variable-speed motor 5 is released, and the speed-change variable-speed motor 5 is started to be operated at a minimum speed. The planetary gears 3 are rotated on the carrier C at a rotational speed given by multiplying a relative rotational speed between the carrier C and the sun gear 1 by a gear ratio of the planetary gear 3 to the sun gear 1. The ring gear 2 is rotated at a rotational speed given by multiplying an absolute rotational speed of the planetary gear 3 by a gear ratio of the ring gear 2 to the planetary gear 3. Thus, the fluid machinery 6 is operated at a minimum speed.

(2) At the Time of Operation

When the rotational speed of the speed-change variable-speed motor 5 is changed, the rotational speed of the sun gear 1, which is directly connected to the speed-change variable-speed motor 5, is also changed. Therefore, the rotational speed of the planetary gears 3, which are rotated on the carrier C, is changed at a speed given by multiplying a relative rotational speed between the carrier C, which is driven by the drive unit 4 at a constant speed, and the sun gear 1 by a gear ratio of the planetary gear 3 to the sun gear 1. As a result, the ring gear 2, which is directly connected to the fluid machinery 6, is rotated at a rotational speed given by multiplying an absolute rotational speed of the planetary gears 3 by a gear ratio of the ring gear 2 to the planetary gear 3, and hence the rotational speed of the fluid machinery 6 is changed.

The first embodiment shown in FIG. 1 has a high-mechanical efficiency and is suitable for a high-speed operation because of a single-pinion-type structure.

Further, in the first embodiment shown in FIG. 1, the rotational speed $\omega s$ of the sun gear 1, which is directly connected to the speed-change variable-speed motor 5, is changed by, for example, increasing or decreasing current for driving the speed-change variable-speed motor 5. Therefore, a revolution speed $\omega c$ of the planetary gears 3, which are supported by the carrier C and are revolved around the sun gear 1 while simultaneously meshing with the sun gear 1 and the ring gear 2, can also be changed.

As a result, a ratio (transmission ratio) of a rotational speed of the ring gear 2 meshing with the planetary gears 3, i.e., a rotational speed $\omega o$ of the output shaft 22, to a rotational speed $\omega i$ of the input shaft 21 can also be changed.

In other words, because the variable-speed motor (variable-speed motor for speed change) 5 is used as a speed-change motive source, the speed change is performed accurately and smoothly.

Next, a second embodiment will be described with reference to FIG. 2.

Figure 2:
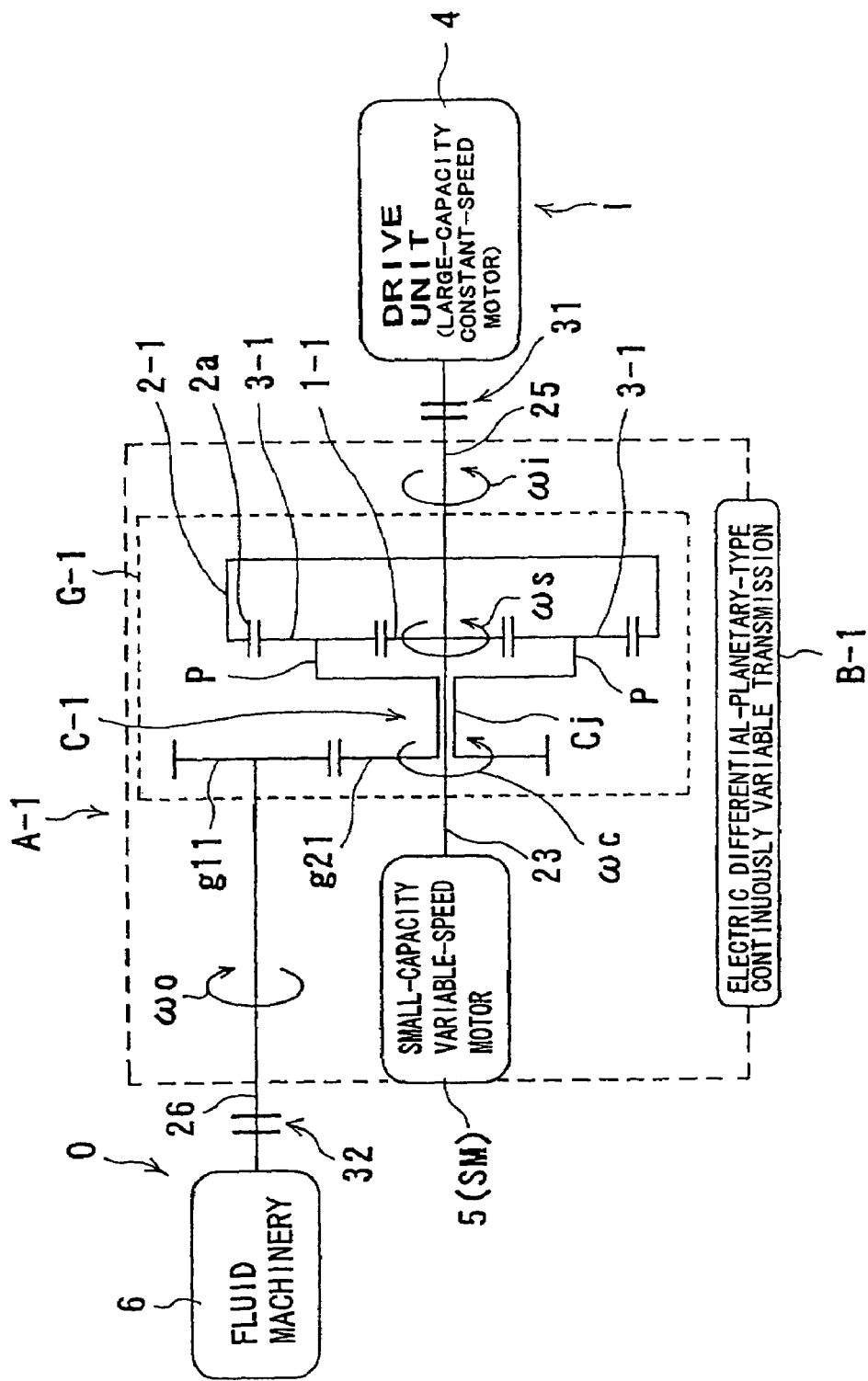
FIG. 2 is a block diagram showing a whole structure of a differential planetary gear apparatus according to a second embodiment of the present invention.

In FIG. 2, a differential planetary gear apparatus, which is indicated by a reference sign A-1 as a whole, comprises an electric differential-planetary-type-type continuously variable transmission B-1 having an input shaft 25 (disposed at the right side in the drawing) and an output shaft 26 (disposed at the left side in the drawing), a drive unit 4 comprising a large-capacity constant-speed motor disposed at an input side I, i.e., connected to one end of the input shaft 25 via an input-side clutch 31, and a fluid machinery 6 disposed at an output side O, i.e., connected to one end of the output shaft 26 via an output-side clutch 32.

The electric differential-planetary-type-type continuously variable transmission B-1 comprises a differential planetary gear assembly G-1 having an input shaft and an output shaft (i.e., the input shaft 25 and the output shaft 26) and a speed-change drive shaft 23, and a speed-change variable-speed motor (a small-capacity variable-speed motor) 5 connected to the speed-change drive shaft 23.

The differential planetary gear assembly G-1 comprises a ring gear 2-1 whose one end forms the input shaft 25, an output gear g11 fixed to the other end of the output shaft 26, a sun gear 1-1 fixed to the other end of the speed-change drive shaft 23, a carrier C-1, and a plurality of planetary gears 3-1 supported by the carrier C-1.

The carrier C-1 comprises a hollow rotating shaft Cj, and an output-side gear g21 fixed to one end (output side) of the rotating shaft Cj and disposed concentrically with the rotating shaft Cj. The output-side gear g21 meshes with the output gear g11. The carrier C-1 further comprises a plurality of planetary gear support shafts P disposed on the other end (input side) of the rotating shaft Cj at radially equal positions from the rotating shaft Cj and spaced from each other at equal intervals in a circumferential direction. These planetary gear support shafts P extend in parallel with the rotating shaft Cj.

The speed-change drive shaft 23 passes through a hollow portion of the rotating shaft Cj of the carrier C-1 in such a state that the speed-change drive shaft 23 is rotatable relative to the rotating shaft Cj. The sun gear 1-1 fixed to the other end of the speed-change drive shaft 23 meshes with the planetary gears 3-1.

The planetary gears 3-1 are rotatably supported by the planetary gear support shafts P of the carrier C-1, and mesh with the sun gear 1-1. The planetary gears 3-1 are held in contact with an internal teeth portion 2a of the ring gear 2-1 and mesh with the internal teeth portion 2a.

The second embodiment shown in FIG. 2 has a high-mechanical efficiency and is suitable for a high-speed operation because the planetary gears 3-1 are of a single pinion type, as with the first embodiment shown in FIG. 1.

Further, in the second embodiment shown in FIG. 2, the rotational speed $\omega s$ of the sun gear 1-1, which is directly connected to the speed-change variable-speed motor 5, is changed by, for example, increasing or decreasing current for driving the speed-change variable-speed motor 5. Therefore, a revolution speed of the planetary gears 3-1 which are supported by the carrier C-1 and are revolved around the sun gear 1-1 while simultaneously meshing with the sun gear 1-1 and the ring gear 2-1, i.e., a rotational speed ωc of the carrier C-1, can also be changed. Accordingly, a speed ratio (transmission ratio) of a rotational speed ωo of the output shaft 26 meshing with the carrier C-1 to a rotational speed ωi of the input shaft 25 can also be changed.

In other words, because the variable-speed motor 5 is used as a speed-change motive source and the rotational speed is changed by the single-pinion-type differential planetary gears, the speed change is performed accurately and smoothly.

Next, a third embodiment will be described with reference to FIG. 3.

Figure 3:
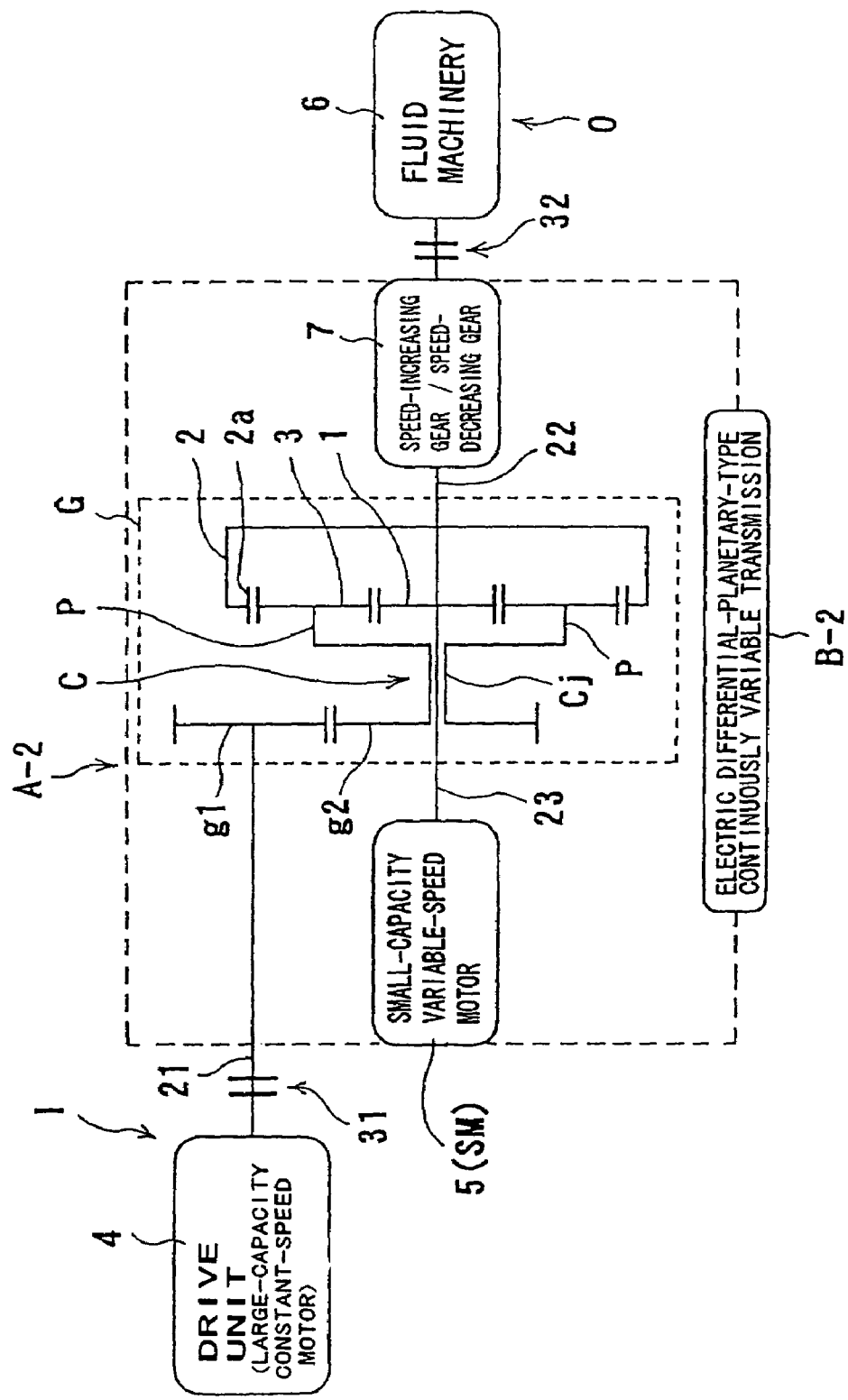
FIG. 3 is a block diagram showing a whole structure of a differential planetary gear apparatus according to a third embodiment of the present invention.

In FIG. 3, a differential planetary gear apparatus, which is indicated by a reference sign A-2 as a whole, has a structure in which a speed-change gear 7, such as a speed-increasing gear or a speed-decreasing gear, is added to the first embodiment shown in FIG. 1. This speed-change gear 7 is disposed on the output shaft 22 at a location between the ring gear 2 and the output-side clutch 32.

According to the third embodiment shown in FIG. 3, the speed change can be performed in a wider speed range, compared with the first embodiment shown in FIG. 1.

Figure 4:
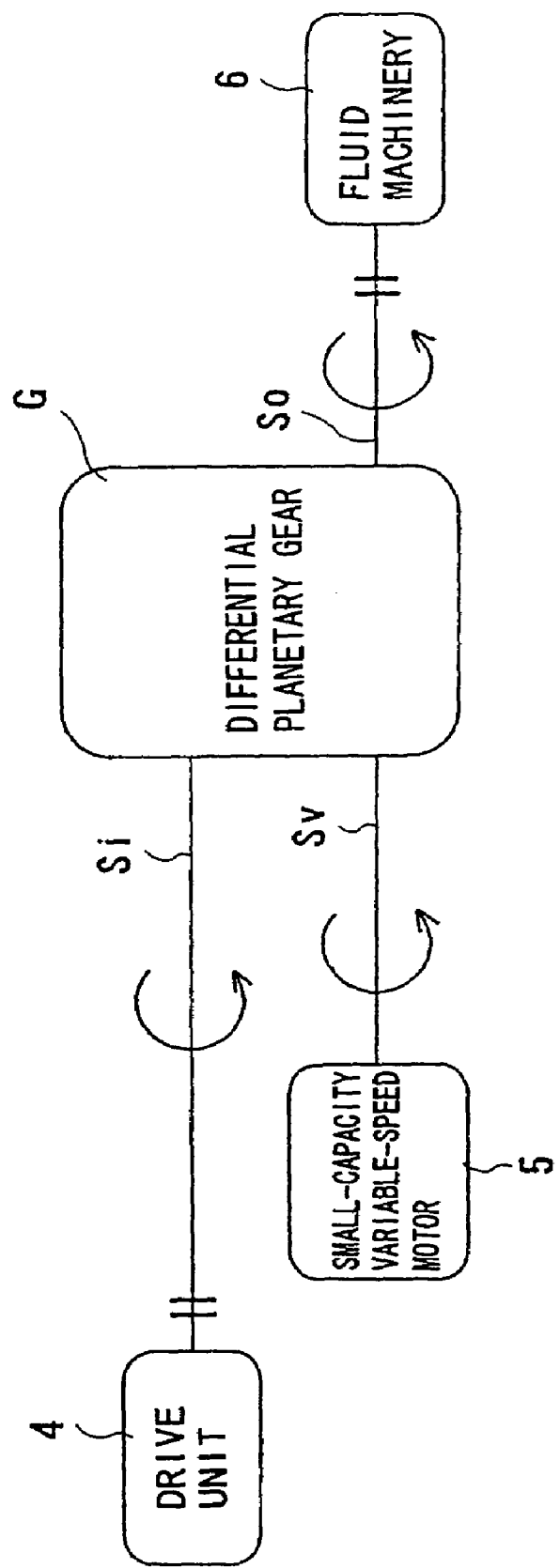
FIG. 4 is a block diagram showing a whole structure of a differential planetary gear apparatus according to a fourth embodiment of the present invention.

FIG. 4 is a block diagram showing a fourth embodiment of the present invention. As with the above-mentioned embodiment, the differential planetary gear G has three rotational elements: the sun gear, the planetary gears, and the ring gear. One of these rotational elements is connected to the drive unit 4 via an input shaft Si, one of the others is connected to the speed-change variable-speed motor (small-capacity variable-speed motor) 5 via a speed-change shaft Sv, and the remaining one is connected to the fluid machinery 6 via an output shaft So.

Figure 5:
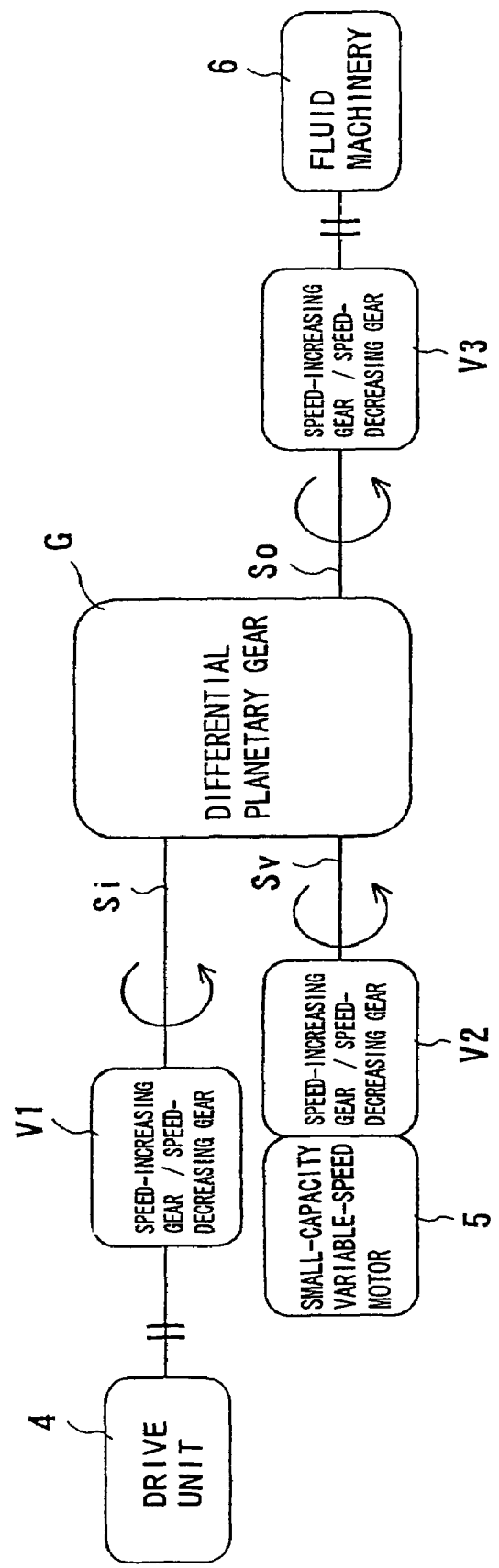
FIG. 5 is a block diagram showing a whole structure of a differential planetary gear apparatus according to a fifth embodiment of the present invention.

FIG. 5 is a block diagram showing a fifth embodiment of the present invention. The drive unit 4 is connected to the input shaft Si of the differential planetary gear G via a speed-increasing or speed-decreasing gear V1. The speed-change variable-speed motor (small-capacity variable-speed motor) 5 is connected to the speed-change shaft Sv of the differential planetary gear G via a speed-increasing or speed-decreasing gear V2. Further, the output shaft So of the differential planetary gear G is connected to the fluid machinery 6 via a speed-increasing or speed-decreasing gear V3.

As shown in FIGS. 4 and 5, the present invention can be practiced in a variety of modifications. The rotational elements are selected according to the required transmission ratio, and whether or not to provide the speed-increasing or speed-decreasing gear is also decided according to the required transmission ratio.

Next, other embodiments will be described with reference to FIGS. 6 through 9.

In the embodiments shown in FIGS. 6 through 9, when the fluid machinery 6 is decelerated, supply of electric power for rotating the speed-change variable-speed motor (small-capacity variable-speed motor) 5 is stopped so that the speed-change variable-speed motor 5 generates electric power and acts as a brake simultaneously.

Figure 6:
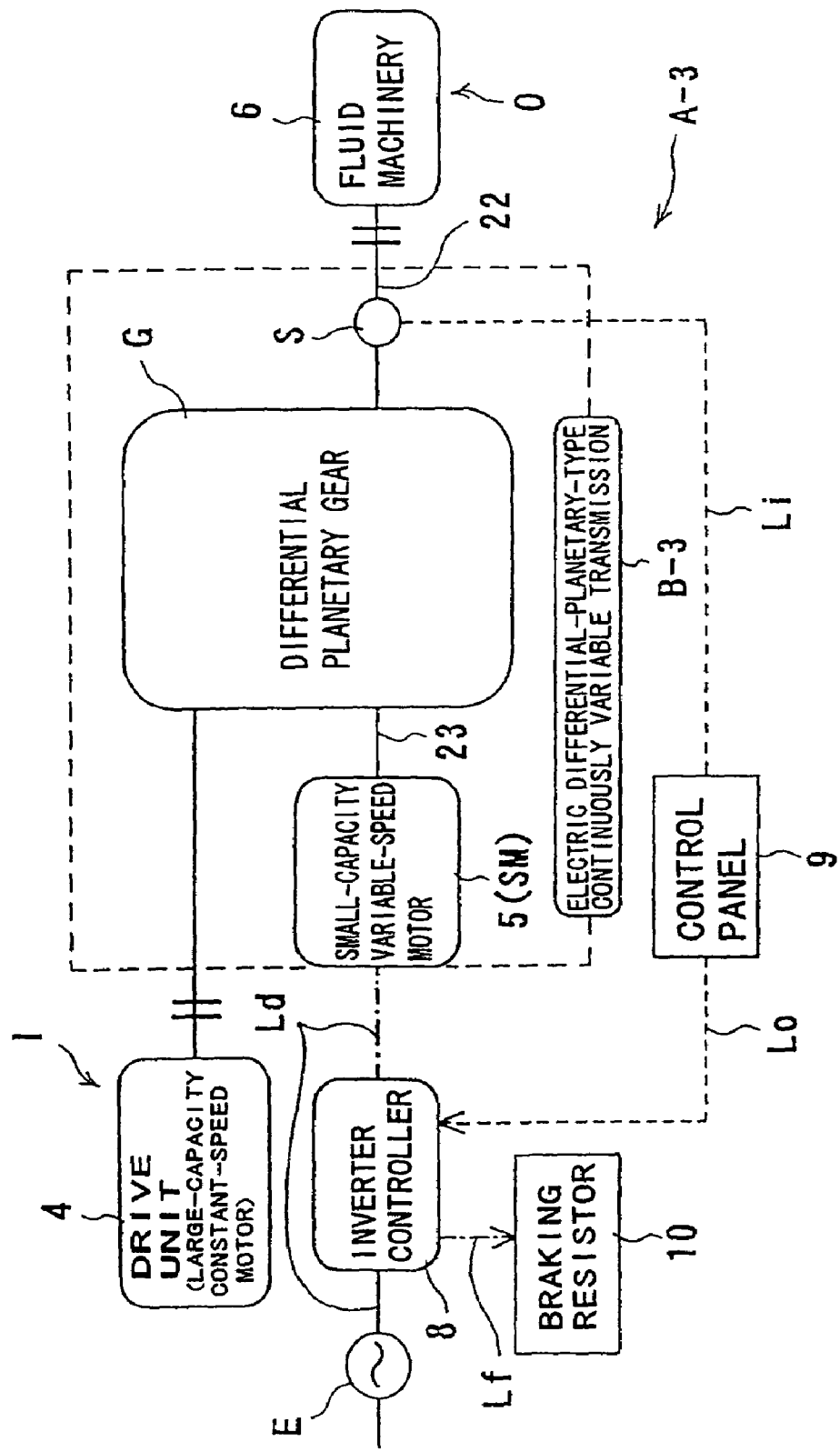
FIG. 6 is a block diagram showing a whole structure of another embodiment of the present invention.

With reference to FIG. 6, there will be described an example in which the supply of electric power for rotating the speed-change variable-speed motor 5 is stopped when the fluid machinery 6 is decelerated so that the speed-change variable-speed motor 5 generates electric power and the generated electric power is absorbed by a braking resistor 10.

In FIG. 6, a differential planetary gear apparatus, which is indicated by a reference sign A-3 as a whole, has a structure in which the following components are added to the first embodiment shown in FIG. 1: A speed sensor S is provided on the output shaft 22, and an inverter controller 8 is provided on a power line Ld connecting the speed-change variable-speed motor (small-capacity variable-speed motor) 5 and an external power E. The inverter controller 8 and the braking resistor 10 are connected by a power line Lf. Further, a control means (control panel) 9 is provided, and the speed sensor S, the control means 9, and the inverter controller 8 are connected by input and output signal lines Li and Lo.

The drive unit 4 is operated at a constant speed. Therefore, in order to accelerate the fluid machinery 6 from a stopped state to a desired speed, or in order to maintain the rotational speed of the fluid machinery 6, the speed-change variable-speed motor 5 is supplied with the electric power from the external power E so that the speed-change variable-speed motor 5 imparts a driving force (rotation) for speed change to the sun gear 1 of the differential planetary gear assembly G.

On the other hand, the speed-change variable-speed motor 5 is constructed so as to act as a power generator when the rotating force (driving force) is imparted from the speed-change drive shaft 23.

Therefore, when the fluid machinery 6 is decelerated after reaching a certain speed (i.e., after a desired driving force is obtained), a resultant of the surplus driving force of the drive unit 4 and an inertial force of the fluid machinery acts so as to impart (return) a driving force to the speed-change variable-speed motor 5 via the sun gear 1. Specifically, when the fluid machinery 6 is decelerated as described above, the supply of the electric power from the external power E to the speed-change variable-speed motor 5 is stopped and the speed-change variable-speed motor 5 generates the electric power.

In consideration of the above-mentioned function of the speed-change variable-speed motor 5, the control means 9 decides whether the differential planetary gear apparatus A-3 is decelerated or not based on the rotational speed of the output shaft 22 obtained by the speed sensor S. If the differential planetary gear apparatus A-3 is decelerated, the control means 9 sends a control signal to the inverter controller 8 so that the supply of the electric power from the external power E to the speed-change variable-speed motor 5 is stopped and the electric power generated by the speed-change variable-speed motor 5 is supplied to the braking resistor 10. At this time, the speed-change variable-speed motor 5 acts as a brake.

Next, a control process of the speed-change variable-speed motor 5 and a power circuit will be described with reference to FIGS. 9 and 6.

In step S1, the control means 9 reads the rotational speed signal of the output shaft 22 sent from the speed sensor S via the input signal line Li, and decides whether the electric differential-planetary-type-type continuously variable transmission B-3 is decelerated or not in step S2.

If the electric differential-planetary-type-type continuously variable transmission B-3 is not decelerated (NO in step S2), the control process proceeds to step S3 in which the speed-change variable-speed motor 5 (expressed as SM in FIG. 9) is used as a motor, and then proceeds to step S4. If the electric differential-planetary-type-type continuously variable transmission B-3 is decelerated (YES in step S2), the control process proceeds to step S5 in which the inverter controller 8 stops the supply of the electric power from the external power E to the speed-change variable-speed motor 5. Further, in this step S5, the inverter controller 8 switches a circuit so as to send the electric power generated by the speed-change variable-speed motor 5 to the braking resistor 10. Subsequently, the control process proceeds to step S6.

In step S6, the speed-change variable-speed motor 5 acts as a power generator, and the generated electric power is sent to the braking resistor 10 where the generated electric power is converted into heat due to braking. Then, the control process proceeds to step S4.

In step S4, the inverter controller 8 decides whether or not to finish the control. If the inverter controller 8 decided not to finish the control (NO in step 4), then the control process is returned to step S1. If the inverter controller 8 decided to finish the control (YES in step 4), then the control is finished.

Figure 9:
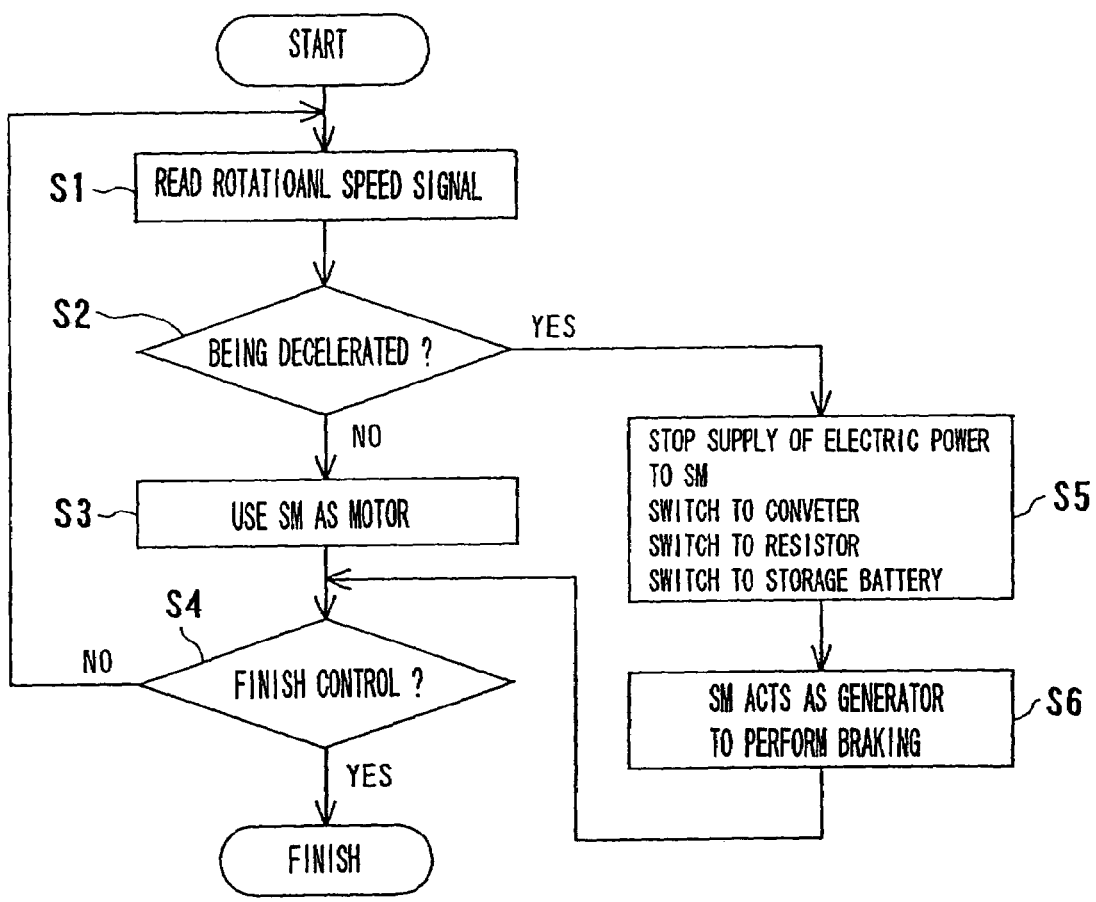
FIG. 9 is a control flow chart illustrating a control process for a functional variation of a speed-change variable-speed motor of the present invention.

According to the embodiment having such a structure shown in FIGS. 6 and 9, the braking resistor can be used as a brake of the differential planetary gear apparatus. Therefore, it is not required to incorporate another brake system for decelerating and stopping the apparatus, and it is not required to put energy into the brake.

Figure 7:
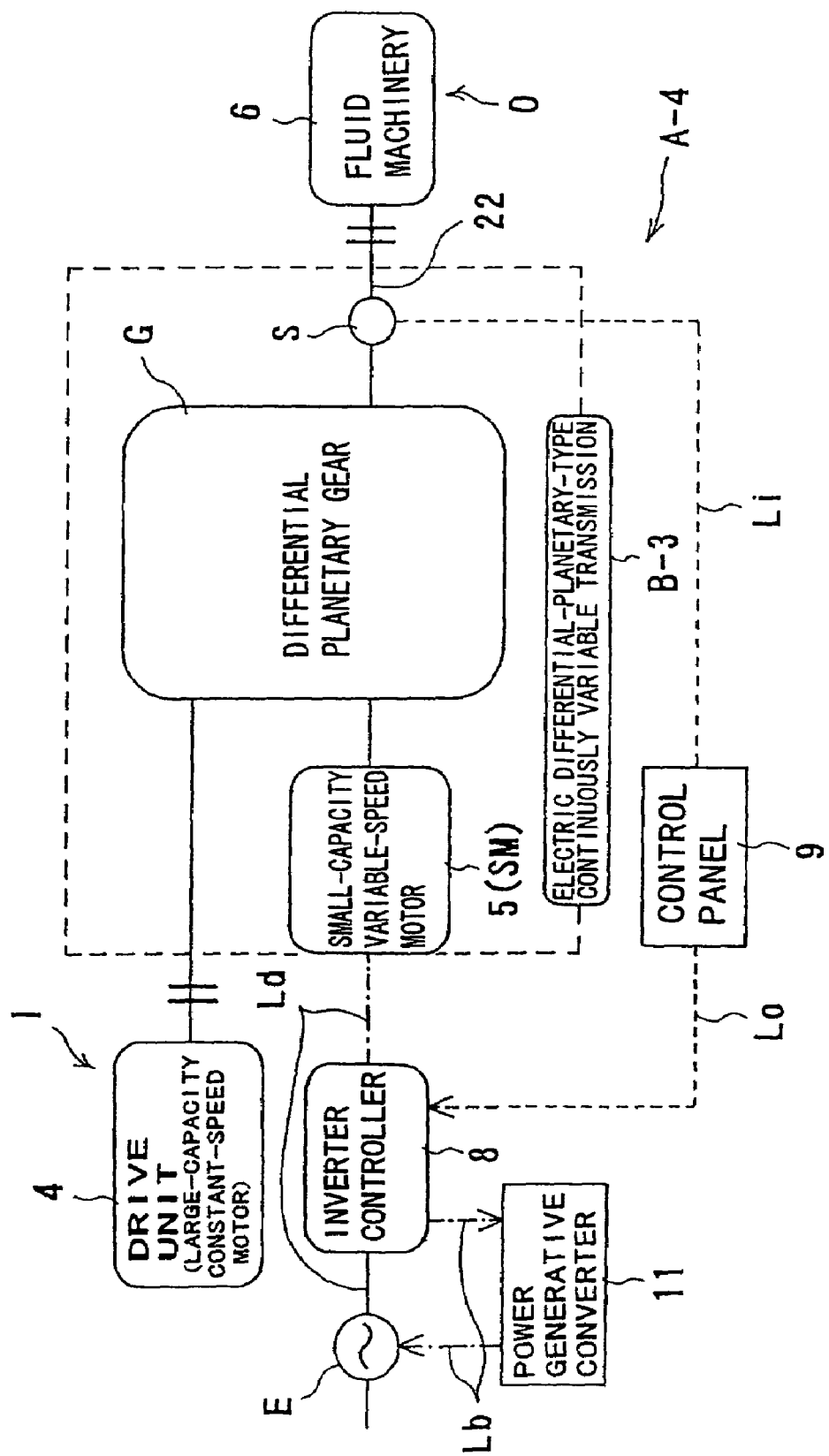
FIG. 7 is a block diagram showing a whole structure of still another embodiment of the present invention.

Another example shown in FIG. 7 is different from the embodiment shown in FIGS. 6 and 9 in that when the electric differential-planetary-type-type continuously variable transmission B-3 is decelerated, the electric power generated by the speed-change variable-speed motor (small-capacity variable-speed motor) 5 is supplied to a power regenerative converter 11 instead of being supplied to the braking resistor 10. The inverter controller 8, the power regenerative converter 11, and the external power E are connected by power lines Lb. The electric power generated by the speed-change variable-speed motor (small-capacity variable-speed motor) 5 is supplied to the power regenerative converter 11, so that the generated power is returned to a power source of the speed-change variable-speed motor (small-capacity variable-speed motor) 5. Other components and operations including a control process are substantially the same as the embodiment shown in FIGS. 6 and 9.

Figure 8:
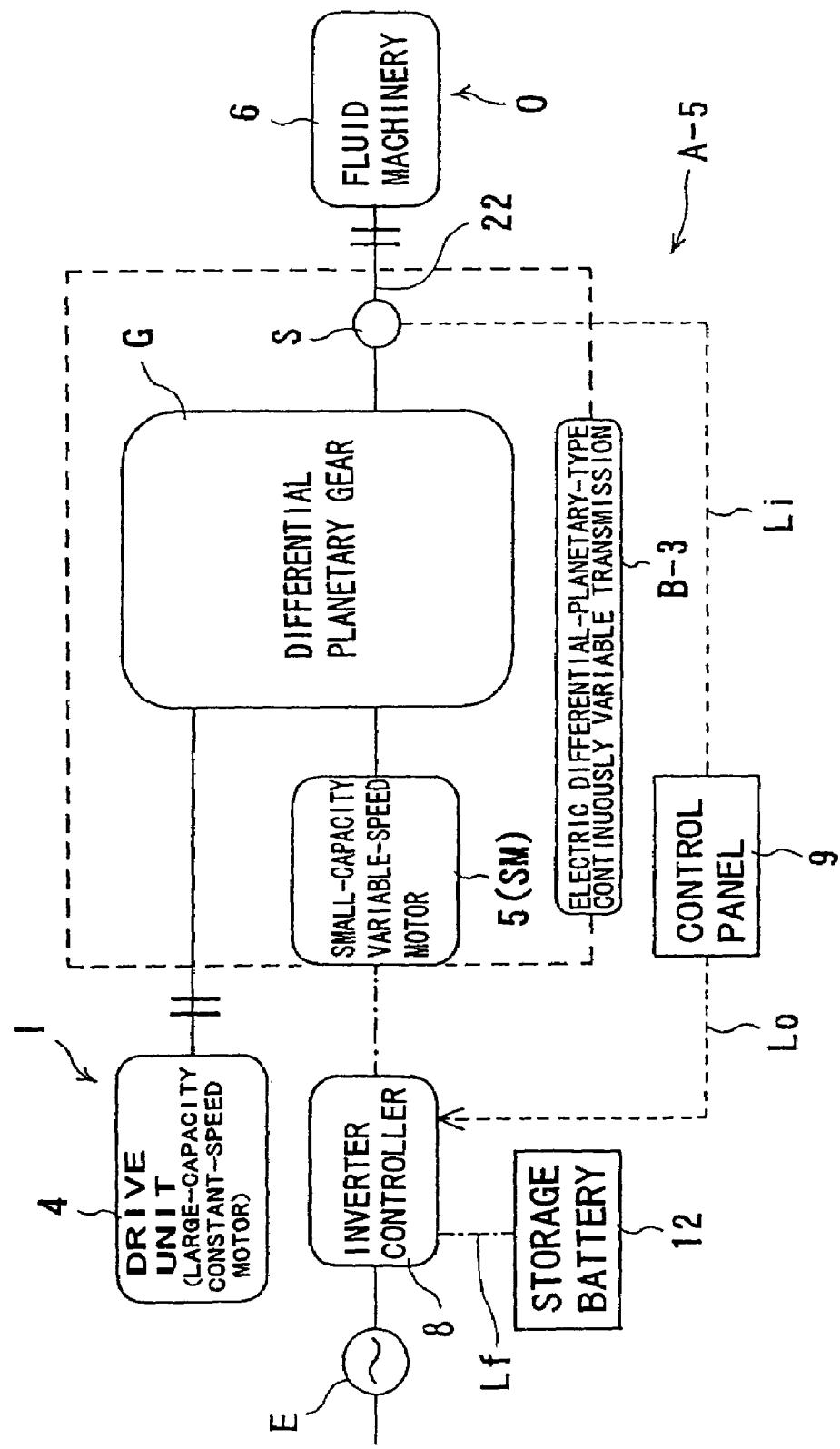
FIG. 8 is a block diagram showing a whole structure of still another embodiment of the present invention.

Another example shown in FIG. 8 is different from the embodiment shown in FIGS. 6 and 9 in that when the electric differential-planetary-type-type continuously variable transmission B-3 is decelerated, the electric power generated by the speed-change variable-speed motor (small-capacity variable-speed motor) 5 is supplied to a storage battery 12 instead of being supplied to the braking resistor 10. The inverter controller 8 and the storage battery 12 are connected by a power line Lf. Other components and operations including a control process are substantially the same as the embodiment shown in FIGS. 6 and 9.

In the embodiments having the above-mentioned structure shown in FIGS. 7 through 9 also, the surplus energy can be recovered as the regenerative electric power or the stored electric power during deceleration, thus enabling an energy-saving operation at all times. While the surplus energy is recovered as the regenerative electric power or the stored electric power, the speed-change variable-speed motor 5 acts as a brake unit.

In the embodiments shown in FIGS. 6 through 9, it is preferable that the differential planetary gear G has a single-pinion-type structure. However, the differential planetary gear G may have a double-pinion-type structure.

Advantages of the differential planetary gear apparatus according to the present invention are listed below.

(a) Because the planetary gears are of single pinion type, a mechanical efficiency is high and a high-speed operation is achieved.

(b) Because the variable-speed motor is used as a speed-change motive source, the speed change is performed accurately and smoothly.

(c) Because the supply of the electric power for rotating the speed-change motive source is stopped so that the speed-change motive source generates electric power, there is no waste of energy and thus it is possible to achieve the energy-saving apparatus which can meet the demands of the times.

(d) The resistance device can be used as a brake of the differential planetary gear apparatus. Therefore, it is not necessary to incorporate another brake system for deceleration and stop of the apparatus, and it is also not necessary to put energy into the brake.

(e) When the output shaft of the electric differential-planetary-type-type continuously variable transmission is decelerated, the surplus energy can be recovered as the regenerative electric power or the stored electric power, thus enabling an energy-saving operation at all times.

(f) Conventionally, in a case of performing a variable-speed operation, it is required to use a large-capacity inverter motor, a large-capacity fluid coupling, a hydraulic transmission such as a torque converter, or a mechanical transmission such as a belt chain CVT, which can cope with a load of the rotary machine, i.e., a driven machinery, such as a fluid machinery. Further, it is also required to use another variable-speed motive source. In contrast thereto, according to the present invention, the variable-speed motive source having a small capacity can be used, and hence the volume of the whole apparatus can be small, and the installation area can also be small.

Next, a sixth embodiment will be described with reference to FIG. 10.

Figure 10:
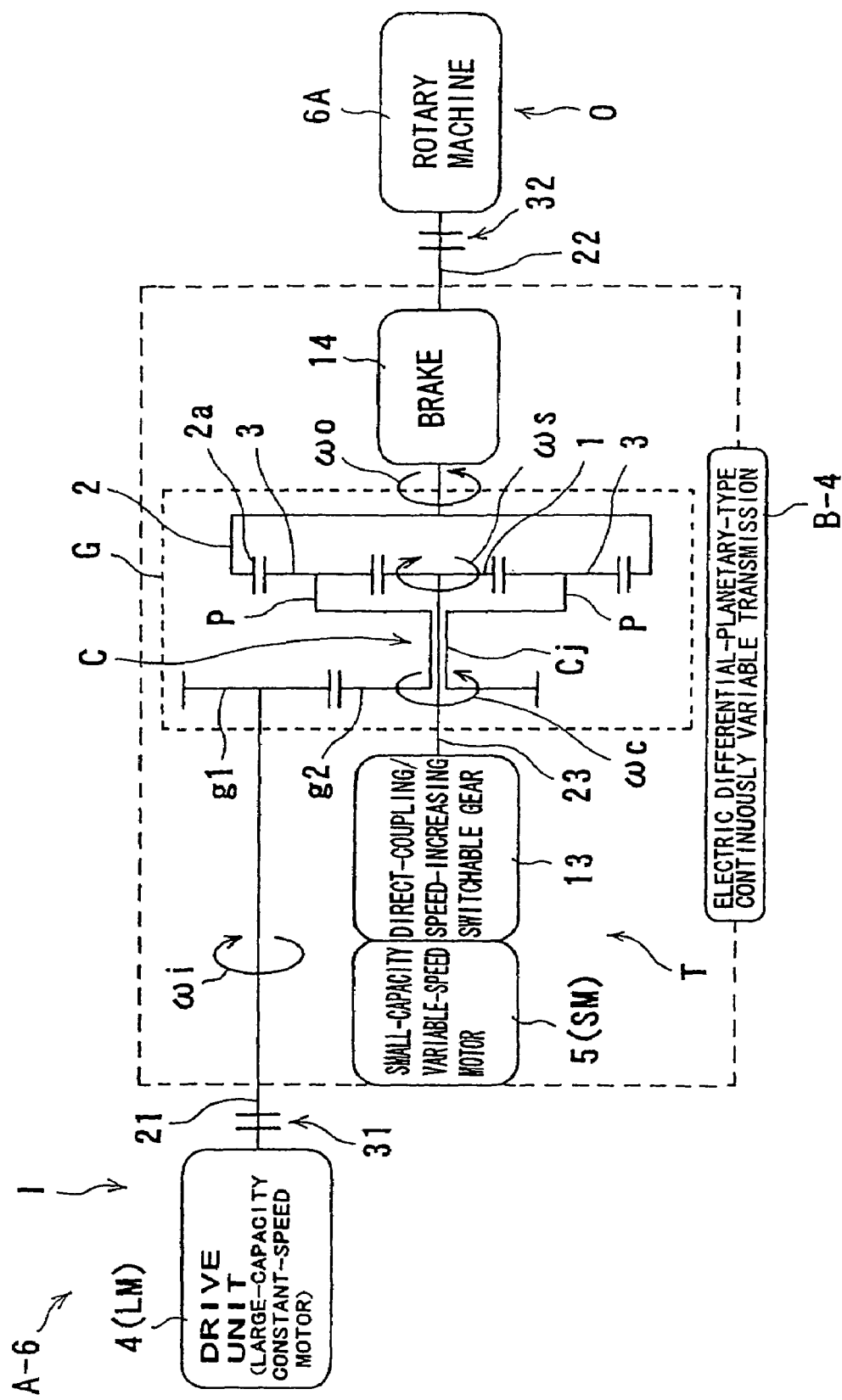
FIG. 10 is a block diagram showing a whole structure of a differential planetary gear apparatus according to a sixth embodiment of the present invention.

In FIG. 10, a differential planetary gear apparatus, which is indicated by a reference sign A-6 as a whole, comprises an electric differential-planetary-type continuously variable transmission B-4 having an input shaft 21 and an output shaft 22, a drive unit 4 comprising a large-capacity constant-speed motor connected to one end of an input side I (i.e., the input shaft 21) via an input-side clutch 31, and a rotary machine 6A connected to one end of an output side O (i.e., the output shaft 22) via an output-side clutch 32. A turbo machinery is used as the rotary machine 6A, for example.

The electric differential-planetary-type continuously variable transmission B-4 comprises a differential planetary gear assembly G having an input shaft and an output shaft (i.e., the input shaft 21 and the output shaft 22) and a speed-change drive shaft 23, a direct-coupling/speed-increasing switchable gear 13 which can switch between a direct-coupling mode and a speed-increasing mode and is connected to the speed-change drive shaft 23, a small-capacity variable-speed motor 5 for speed change connected to the direct-coupling/speed-increasing switchable gear 13, and a brake 14 provide on the output shaft 22.

The differential planetary gear assembly G comprises an input gear g1 fixed to the other end of the input shaft 21, a sun gear 1 provided on one end of the speed-change drive shaft 23 at the opposite side of the direct-coupling/speed-increasing switchable gear 13, a carrier C, a plurality of planetary gears 3 supported by the carrier C, and a ring gear 2 whose one end forms the output shaft 22.

The carrier C comprises a hollow rotating shaft Cj, and an input-side gear g2 provided on one end (input side I) of the rotating shaft Cj and disposed concentrically with the rotating shaft Cj. The input-side gear g2 meshes with the input gear g1. The carrier C further comprises a plurality of planetary gear support shafts P disposed on the other end (output side) of the rotating shaft Cj at radially equal positions with respect to a center of the rotating shaft Cj and spaced from each other at equal intervals in a circumferential direction. These planetary gear support shafts P extend in parallel with the rotating shaft Cj.

The speed-change drive shaft 23 passes through a hollow portion of the rotating shaft Cj of the carrier C in such a state that the speed-change drive shaft 23 is rotatable relative to the rotating shaft Cj. The sun gear 1 provided on the other end (output side O) of the speed-change drive shaft 23 meshes with the planetary gears 3.

The planetary gears 3 are rotatably supported by the planetary gear support shafts P of the carrier C, and mesh with the sun gear 1. The planetary gears 3 are held in contact with an internal teeth portion 2a of the ring gear 2 and mesh with the internal teeth portion 2a. Each of the planetary gears 3 is provided between the sun gear 1 and the ring gear 2 to form a single pinion type.

The brake 14 is operable manually or automatically. When the brake 14 is operated, the output shaft 22, i.e., the ring gear 2, is locked.

On the other hand, the direct-coupling/speed-increasing switchable gear 13 transmits the rotation of the speed-change variable-speed motor 5 to the sun gear 1 in a direct-coupling or speed-increasing manner, which is selectively switched by a non-illustrated switch means.

When starting the rotary machine, the brake 14 is operated, and substantially at the same time, the direct-coupling/speed-increasing switchable gear 13 is shifted to the speed-increasing side. Since the ring gear 2 is locked by operating the brake 14, the planetary gears 3, which mesh with the sun gear 1 and the ring gear 2, are started to be rotated about their own axes by the rotation of the sun gear, which is rotated by the speed-change variable-speed motor 5, and are also started to be revolved around the sun gear 1. The revolution of the planetary gears 3 means the rotation of the carrier C, and thus rotates the input shaft 21 having the input gear g1 which meshes with the input-side gear g2 of the carrier C.

As described above, the input shaft 21 is connected to the drive unit 4 via the input-side clutch 31. Therefore, the rotation of the speed-change variable-speed motor 5, which can adjust its speed, is further increased by the direct-coupling/speed-increasing switchable gear 13 and is transmitted to the drive unit 4. Accordingly, the rotational speed of the drive unit 4 can be quickly increased to nearly the rated rotational speed.

Further, since the ring gear 2 is locked and the rotary machine 6A is in a non-operation state (a stopped state), the whole torque of the speed-change variable-speed motor 5 is effectively transmitted to the drive unit 4.

In other words, it is possible to reduce a load which would be applied in case of rotating the rotary machine 6A at the time of starting.

After the rotational speed of the drive unit 4 reaches the range of ±5% of the rated rotational speed, the brake 14 is released and the direct-coupling/speed-increasing switchable gear 13 is switched to the direct-coupling side. The rotational speed of the rotary machine 6A serving as a driven machinery is gradually increased from a stopped state until its rotational speed reaches the normal-operation rotational speed.

For allowing the planetary gear assembly G to perform the speed change, the speed of the speed-change variable-speed motor 5 is changed (for example, current to be supplied to the motor is increased) so as to change the rotational speed $\omega s$ of the sun gear 1. Therefore, the revolution speed $\omega c$ of the planetary gears 3, which are supported by the carrier C and are revolved around the sun gear 1 while simultaneously meshing with the sun gear 1 and the ring gear 2, can also be changed.

As a result, a ratio (transmission ratio) of a rotational speed of the ring gear 2 meshing with the planetary gears 3, i.e., a rotational speed $\omega o$ of the output shaft 22, to a rotational speed $\omega i$ of the input shaft 21 can also be changed.

In other words, because the variable-speed motor 5 is used as a speed-change motive source and the speed change is performed by the single-pinion-type differential planetary gear, the speed change is performed accurately and smoothly.

Next, a seventh embodiment will be described with reference to FIGS. 11 and 12.

Figure 11:
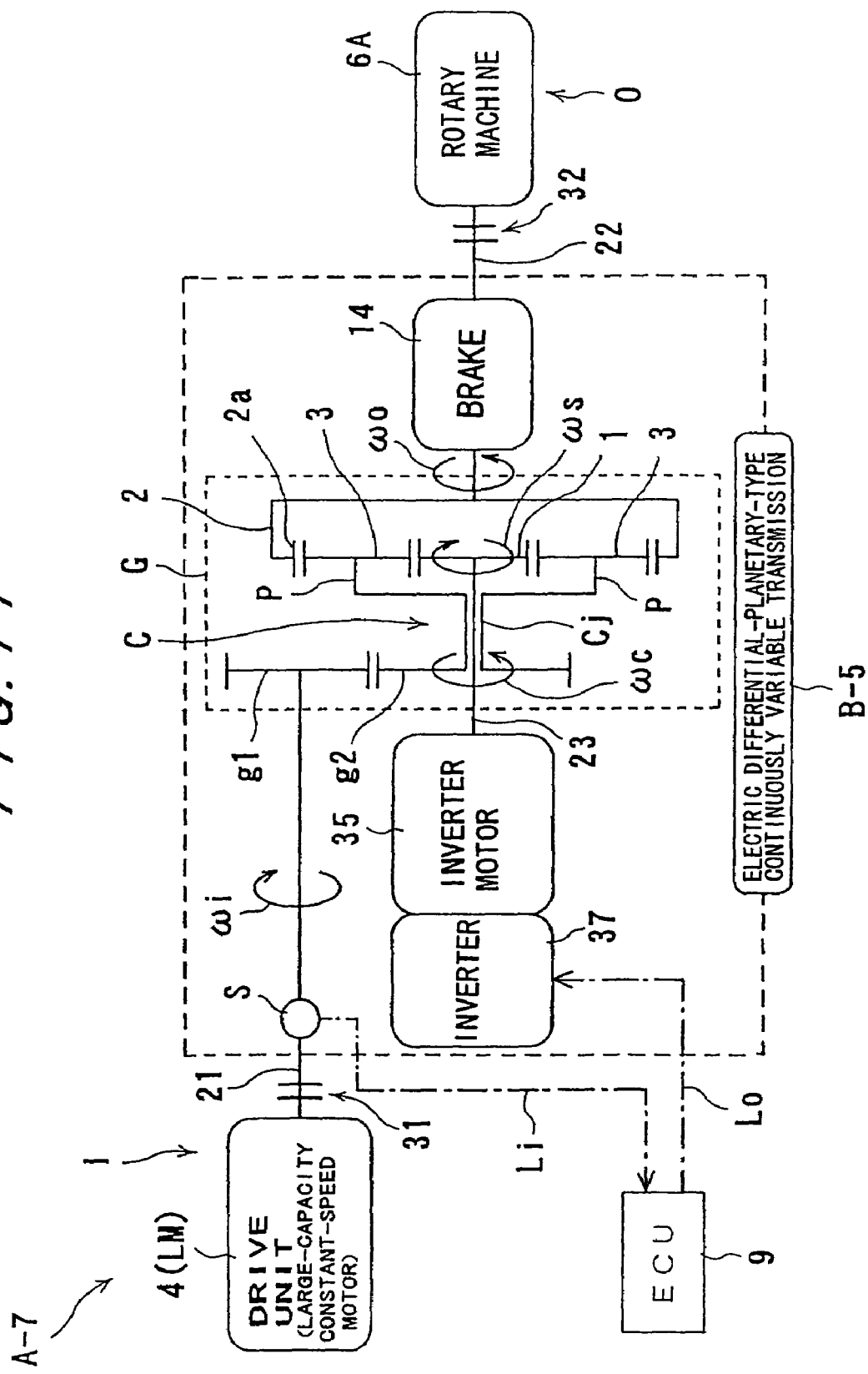
FIG. 11 is a block diagram showing a whole structure of a differential planetary gear apparatus according to a seventh embodiment of the present invention.

In FIG. 11, a differential planetary gear apparatus, which is indicated by a reference sign A-7 as a whole, is different from the sixth embodiment shown in FIG. 10 in the following points: An inverter motor 35 and an inverter 37 are provided instead of the speed-change variable-speed motor 5 and the direct-coupling/speed-increasing switchable gear 13, a speed sensor S is provided on the input shaft 21, a control means 9 (expressed as ELU in FIG. 11) is connected to the speed sensor S by an input signal line Li, and the control means 9 and the inverter 37 are connected to each other by an output signal line Lo.

Figure 12:
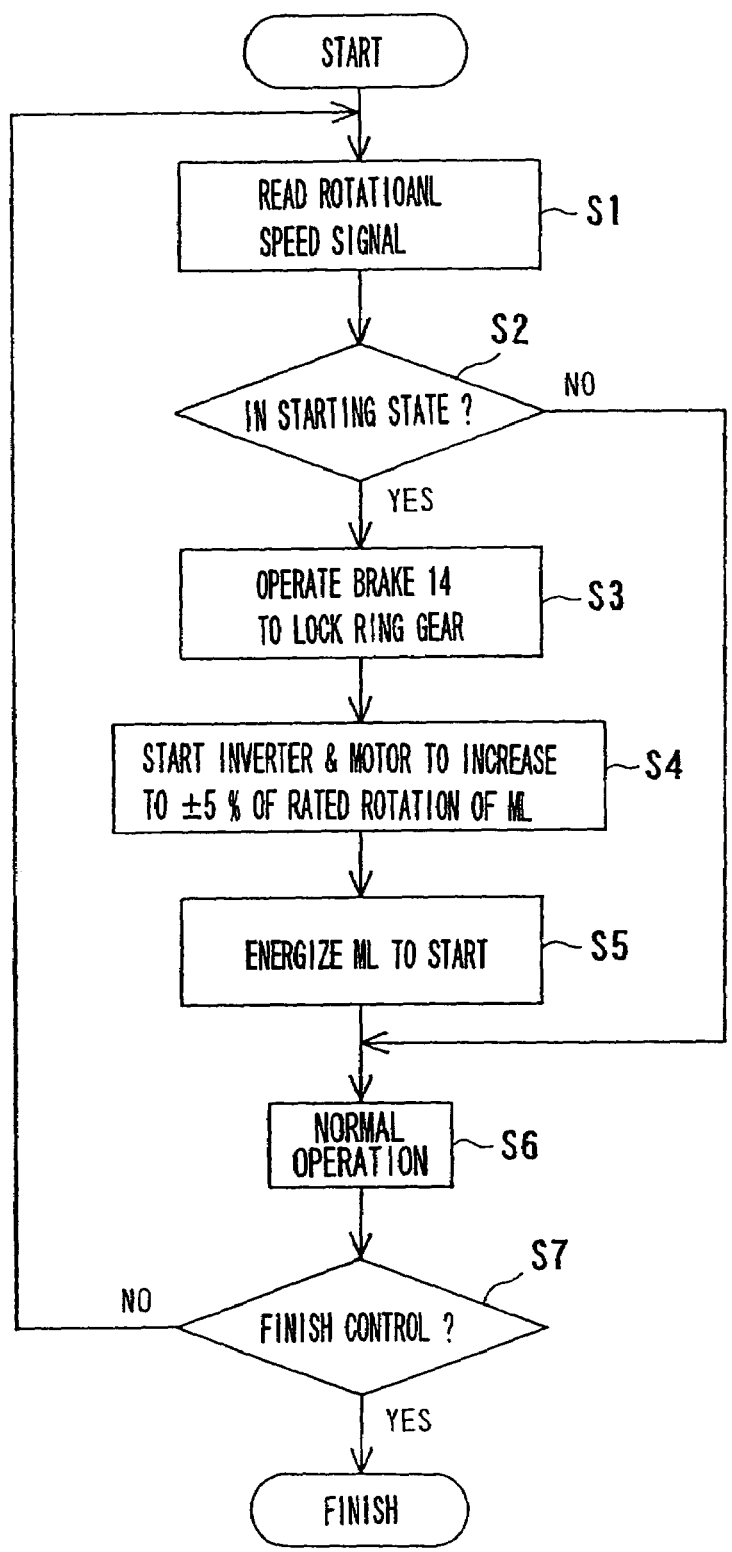
FIG. 12 is a control flow chart illustrating a control process of the starting of the differential planetary gear apparatus according to the seventh embodiment of the present invention.

With reference to FIG. 12, and also to FIG. 11, a control process of the starting of the differential planetary gear apparatus A-7 according to the seventh embodiment will be described below.

In step S1, the control means 9 reads the rotational speed signal of the input shaft 21 sent from the speed sensor S via the input signal line Li, and decides whether or not the drive unit 4 is in a starting state in step S2.

If the drive unit 4 is in the starting state (YES in step S2), the control process proceeds to step S3 in which the brake 14 is operated to lock the ring gear 2, and then proceeds to step S4. If the drive unit 4 is not in the starting state (NO in step S2), the control process proceeds to step S6.

In step S4, the inverter 37 and the inverter motor 35 are started. The inverter motor 35 rotates the sun gear 1 via the speed-change drive shaft 23. When the sun gear 1 is rotated, the planetary gears 3 meshing with the sun gear 1 are rotated about their own axes and the carrier C is revolved. When the carrier C is rotated (i.e., revolved), the input-side gear g2 of the carrier C rotates the input gear g1, thus rotating the drive unit 4 via the input shaft 21 and the input-side clutch 31. The rotational speed of the drive unit 4 is gradually increased until it reaches the range of ±5% of the rated rotational speed of the drive unit 4.

In subsequent step S5, the drive unit 4 is energized so that the drive unit 4 itself is started within the range of ±5% of the rated rotational speed of the drive unit 4, and the drive unit 4 is kept in a normal operation state (step S6).

In step S7, the control means 9 decides whether or not to finish the control. If the control means 9 decided not to finish the control (NO in step S7), then the control process proceeds to step S1. If the control means 9 decided to finish the control (YES in step S7), then the control is finished.

According to the seventh embodiment shown in FIGS. 11 and 12, the control means 9, the inverter motor 35, and the inverter 37 control the starting of the drive unit 4, whereby the drive unit 4 can be started stably.

Further, the small-sized and space-saving apparatus as a whole can be achieved by using the inverter motor 35 and the inverter 37.

Next, an eighth embodiment will be described with reference to FIG. 13.

Figure 13:
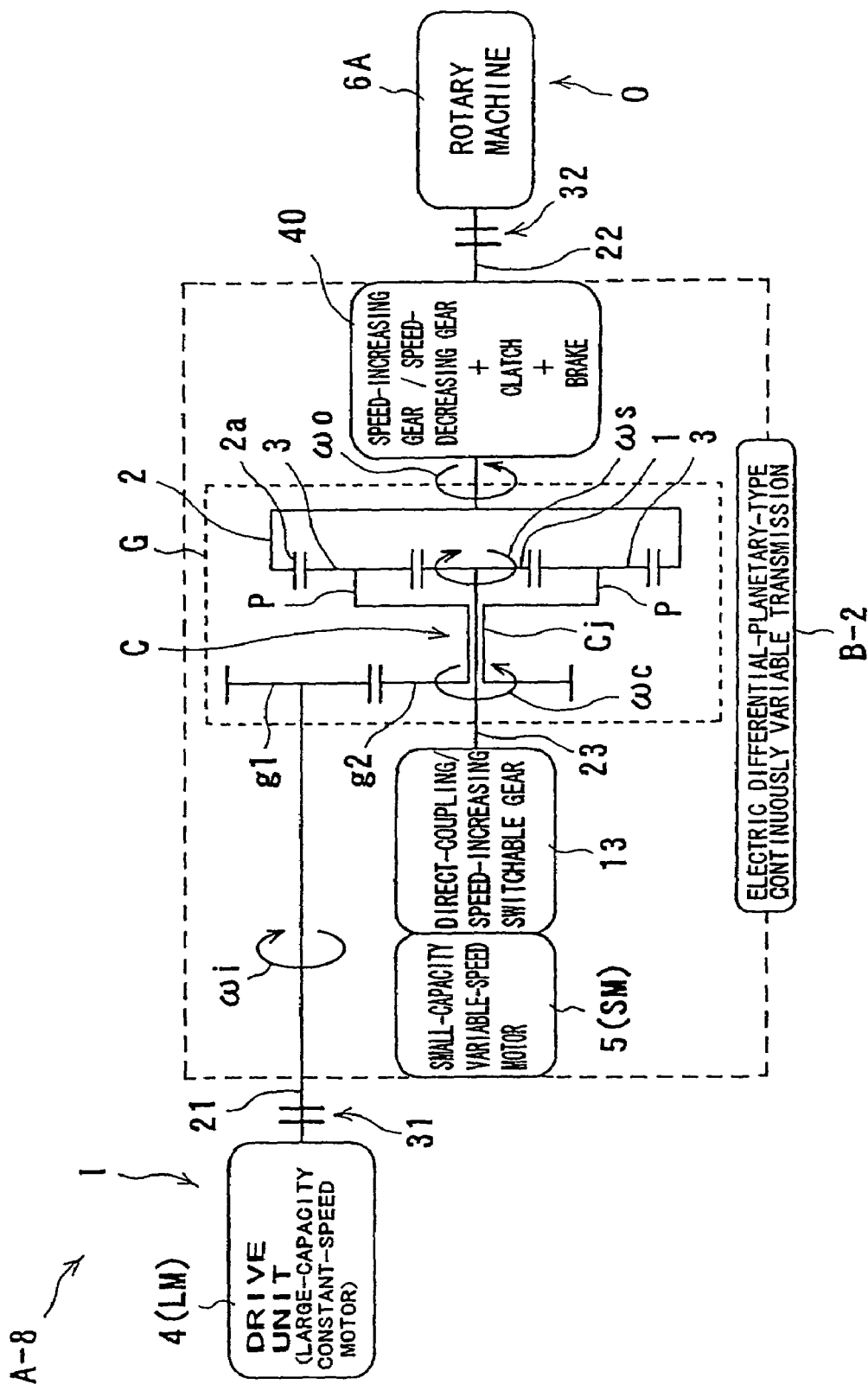
FIG. 13 is a block diagram showing a whole structure of a differential planetary gear apparatus according to an eighth embodiment of the present invention.
Figure 14:
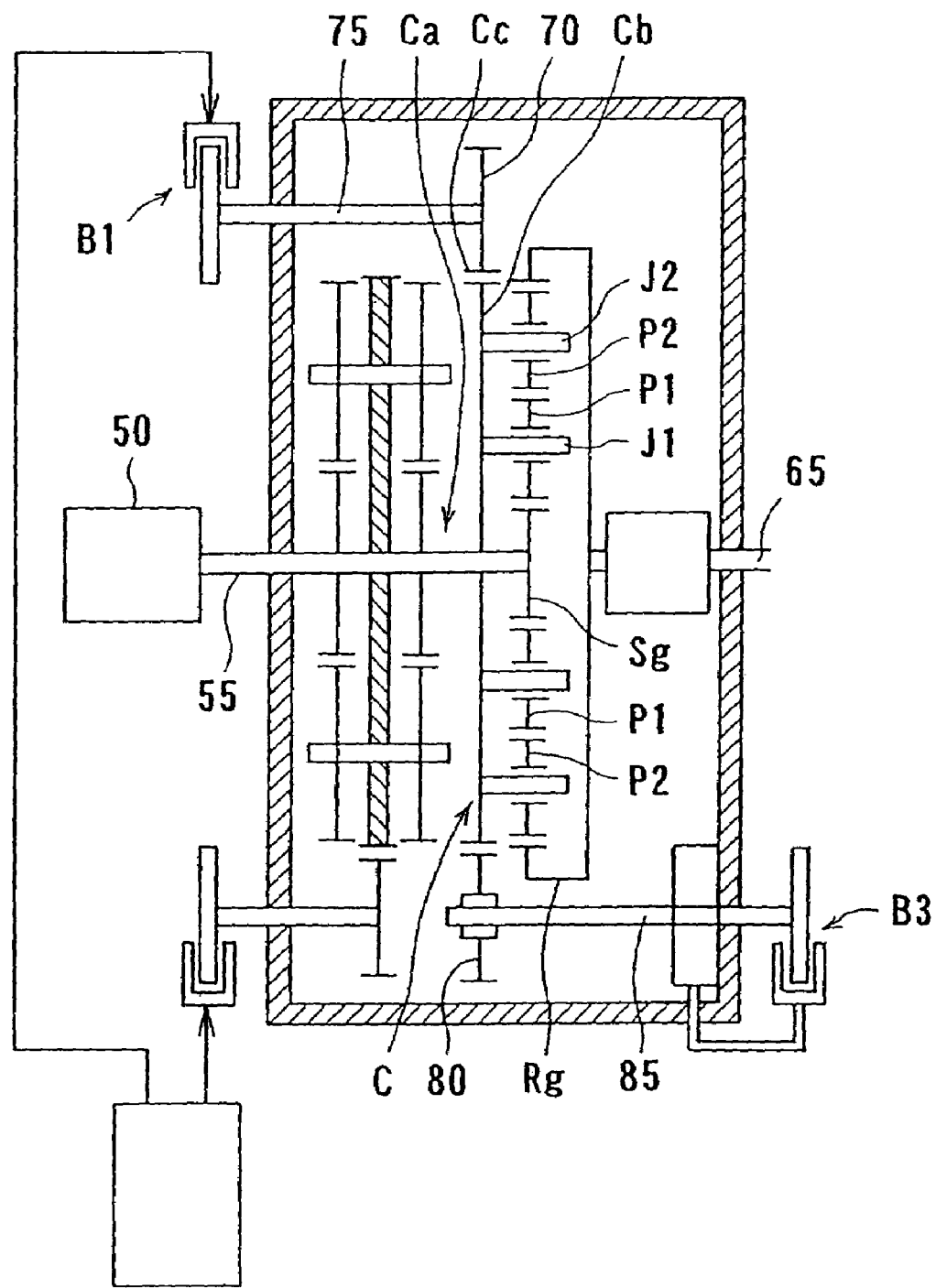
FIG. 14 is a block diagram showing a whole structure of a conventional differential planetary gear apparatus.

In FIG. 13, a differential planetary gear apparatus, which is indicated by a reference sign A-8 as a whole, is different from the sixth embodiment shown in FIG. 10 in that a brake device 40 with speed-change mechanism is provided instead of the brake 14 on the output shaft. This brake device 40 with speed-change mechanism comprises a speed-increasing gear and/or a speed-decreasing gear, and a clutch for switching.

Switching between "speed-changing and braking" is performed by a non-illustrated manual means or automatic means.

Since the brake 14 provided on the output shaft is replaced with the brake device 40 with speed-change mechanism having the speed-increasing gear and/or the speed-decreasing gear and the clutch for switching, the speed change can be performed in a wider speed range, compared with the sixth embodiment shown in FIG. 10.

The illustrated embodiments are only examples and do not limit the scope of the present invention. For example, the positional relationship between the drive unit 4, the speed-change variable-speed motor 5, and the rotary machine 6A is not limited to the arrangement of the sixth embodiment shown in FIG. 10. As one example, the speed-change variable-speed motor 5 may be connected to the input shaft, and the drive unit 4 may be connected to the speed-change drive shaft, while the rotary machine 6A is disposed at the output-shaft side as it is.

Each of the drive unit 4, the speed-change variable-speed motor 5, and the rotary machine 6A can be connected to any one of three shafts of the differential planetary gear apparatus, and a total of six patterns of arrangement can be made. Which one of the six patterns of arrangement should be employed is decided according to several operating conditions (e.g., a desired transmission ratio).

Further, the control process illustrated in the seventh embodiment shown in FIGS. 11 and 12 can be applied to the sixth embodiment and the eighth embodiment.

Advantages of the starting apparatus and method for the differential planetary gear apparatus according to the present invention are listed below.

(a) The rotational speed of the drive source can be quickly increased to nearly the rated rotational speed by the speed-increasing means incorporated in the starting means.
(b) While the drive source is increased to nearly the rated rotational speed, the whole torque of the speed-change motive source is put into the drive source because of the stop means. Therefore, it is possible to reduce a load which would be applied in case of rotating the driven machinery at the time of starting.
(c) Because the inverter motor and the inverter control the starting of the drive source, the drive source can be started stably.
(d) The small-sized and space-saving apparatus as a whole can be achieved by using the inverter motor and the inverter.
(e) Because the motor (e.g., a variable-speed electric motor) is used as the speed-change motive source, the speed change is performed accurately and smoothly.
(f) Because the planetary gears are of a single pinion type, the differential planetary gear assembly has a high-mechanical efficiency and is suitable for a high-speed operation.

INDUSTRIAL APPLICABILITY

The present invention is applicable to a differential planetary gear apparatus, and a starting apparatus and method for a differential planetary gear apparatus.

The invention claimed is:

1. A starting apparatus for a differential planetary gear apparatus having a sun gear, a ring gear, and one or more planetary gears and having a structure in which a drive source, a speed-change motive source, and a driven unit are disposed at any one of an input side, an output side, and a speed-change side, respectively, said starting apparatus characterized in that:

said drive source is energized after a rotational speed of said drive source is increased to nearly a rated rotational speed by a starting means;

said starting means comprises said speed-change motive source, a speed-increasing means provided at an output side of said speed-change motive source, and a rotation transmitting assembly for transmitting rotation from an output side of said speed-increasing means to said drive source; and said rotation transmitting assembly serves as gears and rotating shafts of said differential planetary gear apparatus, wherein a stop means is provided on a rotating shaft connected to said ring gear, and said stop means is operated so as to lock said ring gear while the rotational speed of said drive source is increased by said starting means.

2. A starting apparatus for a differential planetary gear apparatus having a sun gear, a ring gear, and one or more planetary gears and having a structure in which a drive source, a speed-change motive source, and a driven unit are disposed at any one of an input side, an output side, and a speed-change side, respectively, said starting apparatus characterized in that:

said drive source is energized after a rotational speed of said drive source is increased to nearly a rated rotational speed by a starting means;

said starting means comprises said speed-change motive source, a speed-increasing means provided at an output side of said speed-change motive source, and a rotation transmitting assembly for transmitting rotation from an output side of said speed-increasing means to said drive source; and said rotation transmitting assembly serves as gears and rotating shafts of said differential planetary gear apparatus, wherein said speed-increasing means comprises a mechanical transmission having a gear which is independent of the gears of said differential planetary gear apparatus.

3. A starting apparatus for a differential planetary gear apparatus having a sun gear, a ring gear, and one or more planetary gears and having a structure in which a drive source, a speed-change motive source, and a driven unit are disposed at any one of an input side, an output side, and a speed-change side, respectively, said starting apparatus characterized in that:

said drive source is energized after a rotational speed of said drive source is increased to nearly a rated rotational speed by a starting means;

said starting means comprises said speed-change motive source, a speed-increasing means provided at an output side of said speed-change motive source, and a rotation transmitting assembly for transmitting rotation from an output side of said speed-increasing means to said drive source; and said rotation transmitting assembly serves as gears and rotating shafts of said differential planetary gear apparatus, wherein said speed-increasing means comprises an inverter motor and an inverter.

* * * * *

UNITED STATES PATENT AND TRADEMARK OFFICE
CERTIFICATE OF CORRECTION

| | |
|---|---|
| PATENT NO. | : 7,494,438 B2 |
| APPLICATION NO. | : 11/712988 |
| DATED | : February 24, 2009 |
| INVENTOR(S) | : Katsumi Kimura et al. |

It is certified that error appears in the above-identified patent and that said Letters Patent is hereby corrected as shown below:

On the title page:
Insert
Item --(30)      Foreign Application Priority Data

Feb. 21, 2002   (JP) .......................... 2002-44215
Feb. 21, 2002   (JP) .......................... 2002-44224--

Signed and Sealed this

Twenty-sixth Day of May, 2009

JOHN DOLL
*Acting Director of the United States Patent and Trademark Office*